United States Patent Office

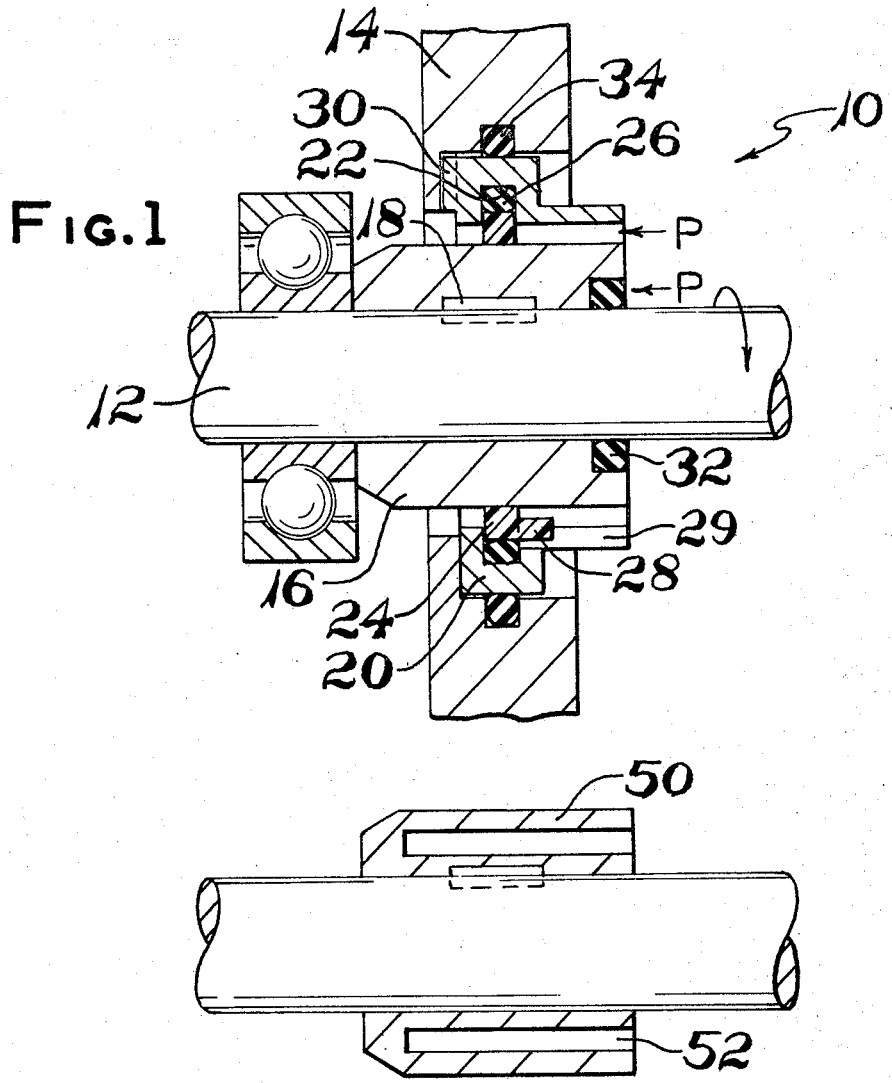
INVENTORS
ELMER J. CHATTIN
LOUIS F. FRAULA
BY Robert R. Yurich
ATTY.

3,526,407
Patented Sept. 1, 1970

3,526,407
ROTARY SEAL
Elmer J. Chattin and Louis F. Fraula, Troy, Ohio, assignors to The B. F. Goodrich Company, New York, N.Y., a corporation of New York
Filed Mar. 11, 1968, Ser. No. 711,985
Int. Cl. F16j *15/00, 9/00*
U.S. Cl. 277—22                        4 Claims

ABSTRACT OF THE DISCLOSURE

A rotary seal assembly for high speed rotary shafts featuring a thermal conductive sleeve member and an annular sealing member adapted for sealing engagement with the sleeve so that heat resulting from the engagement of sealing interfaces is dissipated by the thermal conductive sleeve to reduce heat build-up in the seal assembly.

BACKGROUND OF THE INVENTION

Rotary shafts may be sealed by annular non-rotatable sealing rings which rub directly against the rotating shaft. However, to protect the rotating shafts, these shafts often include a replaceable sleeve or runner member which is mounted to the shaft and onto which the sealing ring rubs against to provide sealing engagement of the shaft.

As the speeds of rotary shafts and the pressures of the fluid to be sealed increases, the amount of heat build-up at the interfaces of the non-rotatable sealing member and the rotary shaft or its sleeve increases substantially. This heat build-up can result in distortion of the sealing interfaces and eventual fluid leakage. Moreover, the effective life of these types of seals can be greatly reduced due to excessive wearing of the sealing surfaces caused by heat build-up. Consequently, it is desirable to provide a rotary sealing assembly that reduces heat build-up between engaging sealing interfaces.

SUMMARY OF THE INVENTION

According to this invention, an improved rotary sealing assembly includes a thermal conductive rotary sleeve adapted for fixed mounting to the primary rotating member, and a nonrotatable annular seal adapted for sealing engagement with the conductive rotary sleeve wherein the conductive rotary sleeve provides a mechanism for transferring heat from the rubbing interfaces to the sealed fluid.

Rotary seals are normally rated by "PV" values; that is the product of the pressures, in p.s.i., which the seal must resist times the tangential velocity of the seal in feet per minute. Existing seals have been rated to a maximum of 30,000–40,000 PV for speeds not to exceed 600 to 700 feet per minute. On the other hand, seals incorporating embodiments of this invention have PV ratings exceeding 240,000 PV with running speeds of 2400 feet per minute at 100 p.s.i. It is readily apparent that seals according to this invention provide significantly improved operating results. The removal of heat from the engaging sealing interfaces not only results in these higher operating performances but results in extended service life.

BRIEF DESCRIPTION OF THE DRAWINGS

FIG. 1 is an axial cross section of one preferred embodiment of the seal assembly mounted in position on a rotating shaft; and
FIG. 2 illustrates a modified rotating sleeve member for alternate use in the rotating seal assembly of FIG. 1.

DETAILED DESCRIPTION

Referring to FIG. 1, the rotating seal assembly 10 is adapted for sealing the space between a rotating shaft 12 and its housing 14.

The seal assembly 10 generally includes a conductive rotating sleeve 16 which is mounted to shaft 12 and keyed to the shaft by means of drive key 18. The seal assembly 10 includes an annular seal retaining member 20 having an inside diameter greater than the outer diameter of the rotating sleeve 16. This retainer member 20 includes an annular recess 22 into which an annular seal 24 and a static O-ring 26 are fiitted in the manner shown in FIG. 1. The static O-ring 26 is positioned in the recess 22 of retainer 20 so that it performs as a spring to force the seal 24 radially toward sleeve 16 to cause a sealing engagement of the inside diameter of seal 24 against the outside diameter of rotating sleeve 16.

The seal 24 is maintained in a non-rotation condition relative to seal retainer 20 by a plurality of integral axially extending anti-rotation lugs 28 which extend into mating slots 29 on retainer member 20 as shown in FIG. 1. Similarly, the retainer member 20 is maintained non-rotatable relative to housing 14 by a plurality of integral anti-rotation lugs 30. The seal assembly 10 further includes an O-ring 32 positioned in a rear ridge of rotating sleeve 16 to seal the O.D. of the shaft 12 and rotating sleeve 16. A second O-ring 34 is positioned in a suitable annular recess of housing 14 to seal the O.D. of the seal retainer 20 and the inside diameter of the housing 14.

The rotating sleeve 16 is manufactured from a highly conductive material. It has been found that copper and copper alloys are by far the best material to be used in this application. The sealing surface of rotating sleeve 16 may be plated or coated with suitable materials to reduce the wear between the seal 24 and the rotating sleeve 16. However, in either instance, the plating or coating must be applied very thin to assure proper conduction and dissipation of heat through rotating sleeve 16.

The annular seal 24 may be of a fluorocarbon material, such as Teflon, or any other suitable material having a low coefficient of friction and a substantial resistance to deformation at operating temperatures and pressures. Unexpectedly, the use of a Teflon sealing ring on a copper or copper alloy sleeve has proven to be the best material combination for this type of seal assembly.

The retainer member 20 makes the seal assembly 10 a generally self-contained unit which can be handled and installed conveniently. Moreover, the retainer member 20 may function as an adapter for replacement services where the removed seal had a substantially different diameter.

During the rotation of rotary shaft 12, the spring-like O-ring 26 forces annular sealing ring 24 into sealing engagement against the rotating sealing face on the outer diameter of rotation sleeve 16. As the rotary sleeve rubs against nonrotating annular sealing ring 24, substantial heat is generated by the frictional engagement of these sealing interfaces. As heat is generated, the conductive rotary sleeve 16 acts as a conductor to dissipate the heat away from the sealing interfaces into the fluid on the right side of seal 10 as viewed in FIG. 1.

Referring to FIG. 2, a modified conductive rotating sleeve 50 may be incorporated into a seal assembly similar to that described for the foregoing sealing assembly 10. This conductive sleeve 50 includes an annular passageway 52 through which fluid is circulated to further improve the heat dissipating characteristics of the seal.

What is claimed is:
1. A seal assembly for rotary shafts comprising:
a conductive rotating sleeve member adapted for positive mounting to a rotary shaft, a first sealing ring member positioned on a rear ridge of said rotating sleeve providing a positive seal between the rotating sleeve and the rotary shaft, a seal retainer member having a plurality of integral lugs adapted for anti-rotational interlock between a housing member and said seal retainer member, a second sealing ring member having axial extending anti-rotation lugs adapted to engage with said seal retainer member for anti-rotational mounting and bearing on said conductive rotating sleeve member as a positive seal, an elastic annular member adapted to directly and compressibly bear on said second sealing ring member in a radial plane relationship to the said rotary shaft, a third sealing ring member adapted to engage said housing member in an annular recess and to compressibly bear on said seal retainer member providing a positive seal between the housing member and the seal retainer member.

2. A seal assembly according to claim 1 wherein said rotating sleeve member has substantial mass and an outer diameter substantially greater than the said rotating shaft diameter.

3. A seal assembly according to claim 2 wherein said rotating sleeve member is a copper or copper alloy sleeve and said second sealing ring member is a fluorocarbon ring.

4. A seal assembly according to claim 2 and further comprising axially extending slot portions on said seal retainer member for receiving said anti-rotation lugs of said second sealing ring member to prevent rotation of said second sealing ring member relative to said seal retainer member.

References Cited

UNITED STATES PATENTS 2,956,824 10/1960 Kuchler et al. _____ 277—22 X
3,300,225 1/1967 Shepler _____ 277—165

FOREIGN PATENTS 1,038,019 8/1966 Great Britain.

SAMUEL ROTHBERG, Primary Examiner

U.S. Cl. X.R.

277—26, 37, 165